United States Patent
Rath

[15] 3,665,713
[45] May 30, 1972

[54] CONTAMINANT CONTAINMENT METHOD AND APPARATUS

[72] Inventor: Eric Rath, P.O. Box 226, La Jolla, Calif. 92037

[22] Filed: June 18, 1970

[21] Appl. No.: 47,455

[52] U.S. Cl. ............................................................ 61/1 F
[51] Int. Cl. ........................................................ E02b 15/04
[58] Field of Search ...................... 61/1 F; 210/242, DIG. 21

[56] References Cited

UNITED STATES PATENTS 3,491,023  1/1970  McCormick ..................... 210/242 X

FOREIGN PATENTS OR APPLICATIONS 1,032,121  6/1958  Germany ....................... 210/DIG. 21
953,743    4/1964  Great Britain ........................ 61/1 F

*Primary Examiner*—Peter M. Caun
*Attorney*—Herbert C. Schulze

[57] ABSTRACT

This is a method and apparatus for containment of contaminants on fluid surfaces, particularly such as oil spillages in ocean waters, wherein the use of a floating barrier with submerged shield segments carrying high pressure jets is utilized in interconnected, segmented form.

1 Claim, 10 Drawing Figures

Patented May 30, 1972

INVENTOR
Eric Rath,

By Herbert C. Schulze
ATTORNEY.

Patented May 30, 1972 3,665,713
3 Sheets-Sheet 3
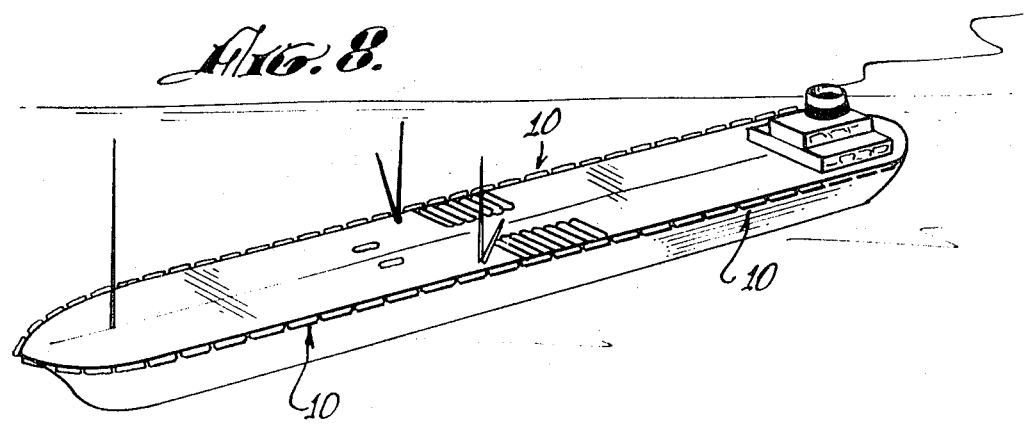
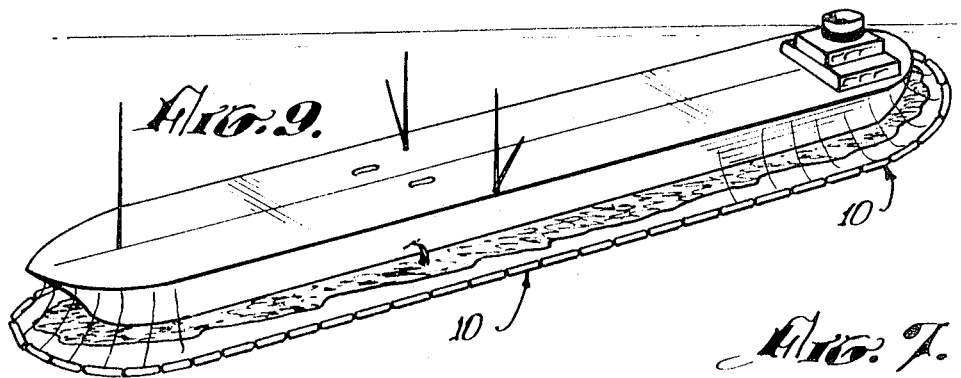
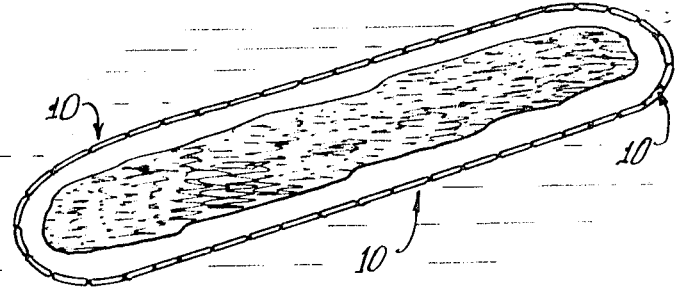
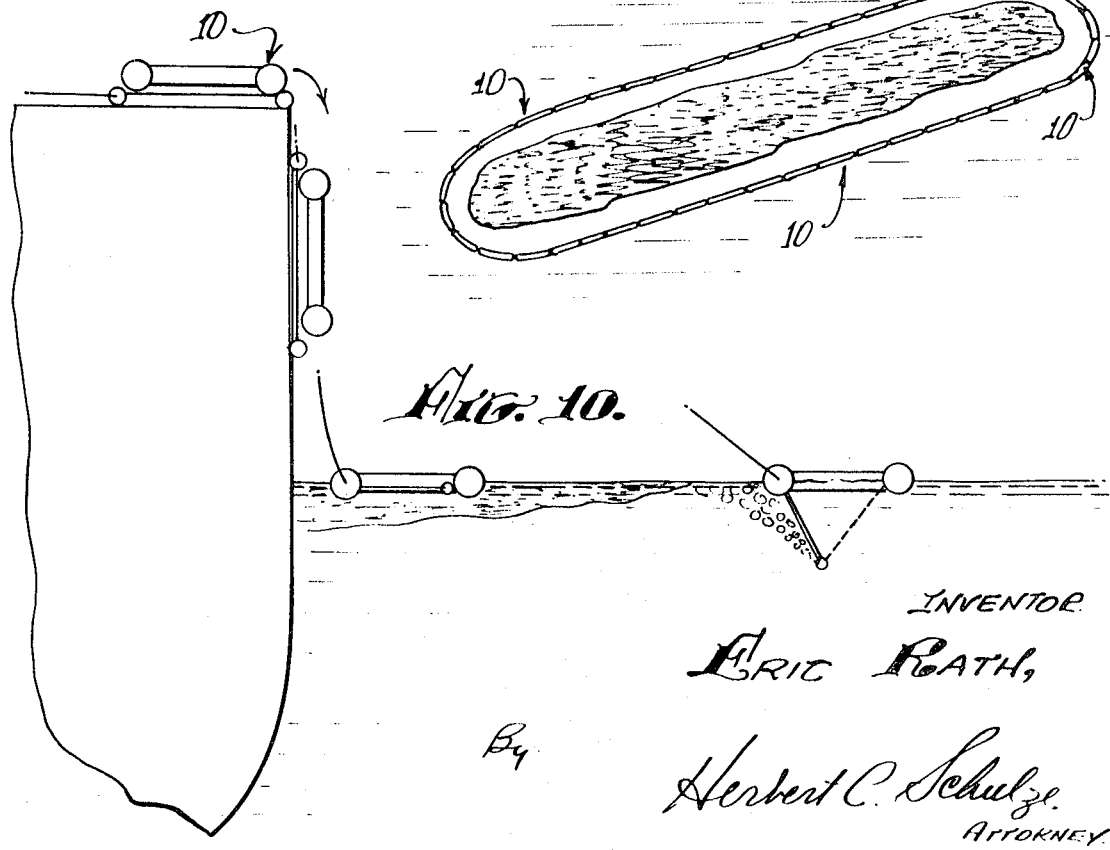
INVENTOR
ERIC RATH,
By
Herbert C. Schulze
ATTORNEY.

CONTAMINANT CONTAINMENT METHOD AND APPARATUS

BACKGROUND OF THE INVENTION

1. Field of the Invention

This invention is in the general field of containment of contaminants on fluid surfaces, particularly such as large bodies of water, including oceans, lakes, and the like. More particularly, the particular invention utilizes a method of employing high pressure jet streams for maintaining a containment barrier and for constantly directing and redirecting contaminant within such containment barrier until it is removed.

2. Description of the Prior Art

There is no direct prior art having a parallel to the present invention, known to the Applicant. There have been may attempts to provide containment arrangements for oil spillage, such as underwater tents, floating barriers and supplies of absorbent material such as straw, and such similar and customary arrangements.

There is not known to the Applicant, however, any comparable method by which underwater jets are utilized for surface containment and removal of contaminants.

SUMMARY OF THE INVENTION

Great attention is being directed, at the present time, to the serious problems of pollution of natural resources of all types. One of the greatest sources of concern at the moment is the contamination, particularly by oil spillage, of large bodies of water such as ocean bodies, lake bodies, and the like. It is an accepted fact that spillages from natural or manmade causes are to be expected regularly, particularly within ocean areas. These spillages cause great damage, as is well-known, and great effort is being directed towards the solution of this problem.

The ideal solution to spillage is to contain it immediately upon occurrence for subsequent removal or treatment. The basic problem involved, however, is that such spillage spreads rapidly over large areas, to a large extent because of non-existence of easily transportable, effective means for containment. Also, in the case of ships at some distance from shore and the like, there is no satisfactory way to have immediate containment possibility in the event of accident-causing spillage from ships.

In attempting removal in the customary manner, generally a considerable amount of the spilled material is actually caused to spread over larger areas by the removal efforts themselves.

It has been deemed advisable and desirable to contain such spillages upon the surface of the water for removal by pumps and the like. However, because of the nature of the problem, this has been most difficult and particularly because of the nature of the continuously shifting ocean currents.

I have devised a method by which high pressure jets are operated in a predetermined configuration beneath the surface of the water in such manner that their activation causes the contamination to be totally contained within a confined area and additional contamination from the same source to be directed by the same area and at the same time form a physical as well as hydraulic barrier to its spreading beyond the confines of the containment area.

My method and apparatus incorporates provision within a highly portable unit for containment and maintenance of the same with proper barriers and the like, as well as means for directing the further flow of contaminants.

On a ship, for example an oil tanker, there is always great danger of accident or the like causing large spillage directly from the ship. It of course is not feasible to attempt to reach a stricken ship within a matter of moments and no heretofore known method was capable of containing the oil spillage from tankers. My method, however, includes the possibility of using same units as would be used in any case and having them on board ship for immediate deployment on the water to surround and contain any spillage occurring from the ship.

It is an important object of this invention to provide an economical and reliable method of containing contaminant upon a fluid body and curtailing within the same area additional contaminant as it arises.

It is a further object of this invention to provide a means for physical and hydraulic containment of contaminants upon a fluid body.

Another object of this invention is to provide a combined arrangement for containment of existing spillage and containment of additional spillage as it may occur.

Another object of this invention is to provide apparatus to be carried by an oil tanker fully capable of containing any spillage from the tanker in case of accident or the like.

The foregoing and other objects and advantages of this invention will become clear to those skilled in the art upon the reading of the Description Of A Preferred Embodiment in conjunction with the drawings attached to this Application.

BRIEF DESCRIPTION OF THE DRAWINGS

FIG. 4 is a view from 4—4 on FIG. 3, but with the drop shield in operation and the unit in operation;

FIG. 5 is an enlarged, partial section on 5—5 of FIG. 4;

FIG. 6 is a reduced end view showing an alternate suspension of drop shield and alternate air supply;

FIG. 7 is a schematic drawing of a series of units in operation containing a contaminate;

FIG. 8 is a perspective of a tanker showing elements of the apparatus of this invention on the deck;

FIG. 9 is the same view as FIG. 8 but showing the containment elements dropped to contain spillage occurring around the ship; and FIG. 10 is a schematic, broken sketch indicating the positioning of the containment elements and their deployment into the water from the ship shown in FIGS. 8 and 9.

DESCRIPTION OF A PREFERRED EMBODIMENT

Figure 1:
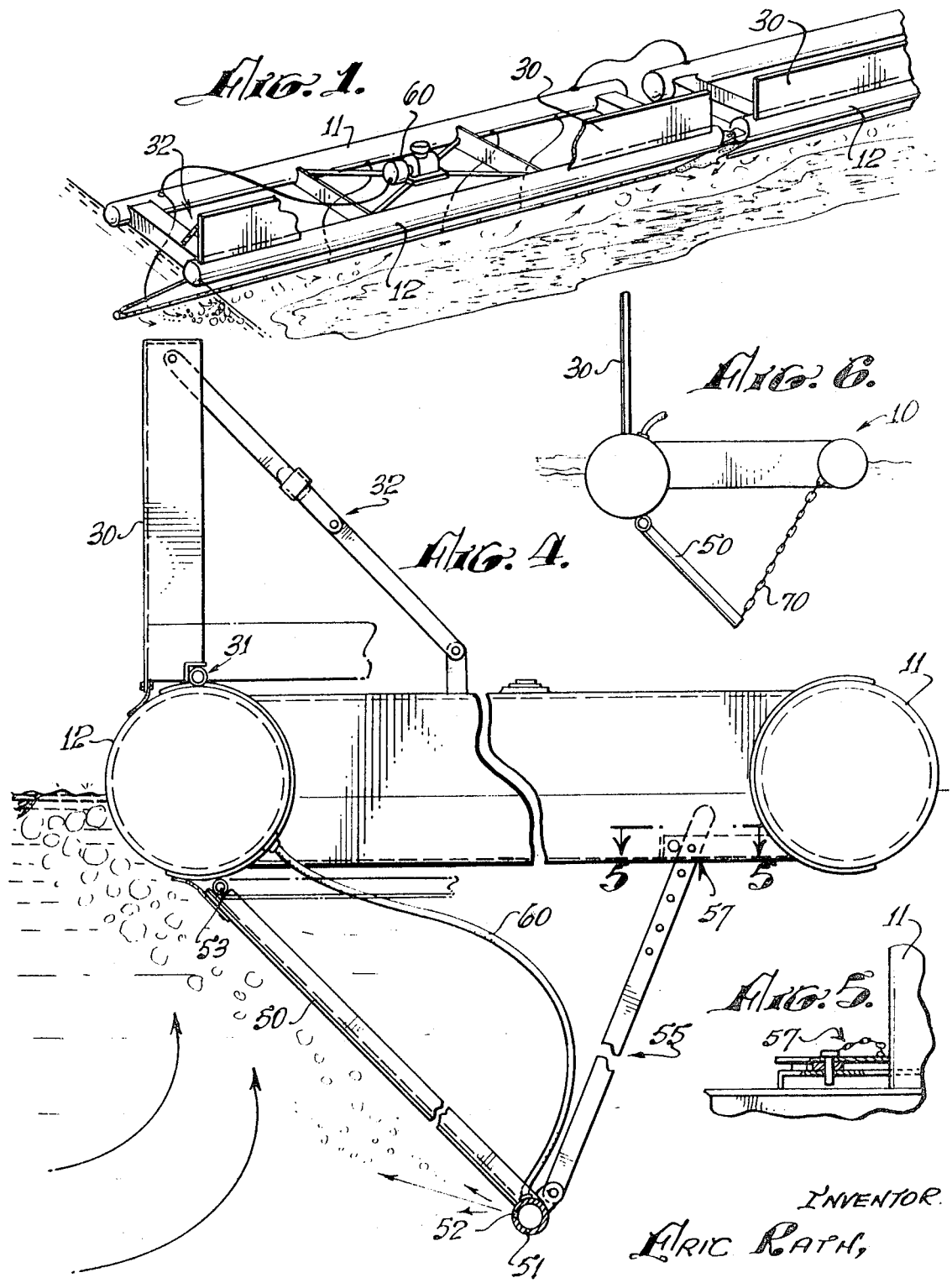
FIG. 1 is a perspective view of a fluid surface with a preferred embodiment of the apparatus performing the method of this invention.
Figure 2:
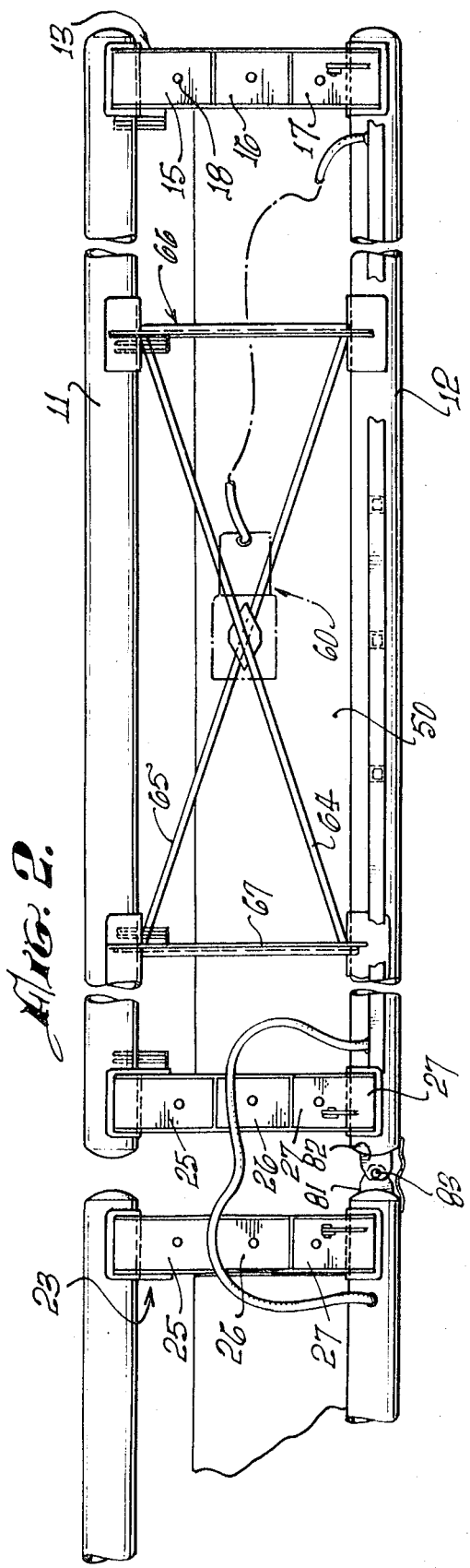
FIG. 2 is an enlarged top view, partially broken, of the apparatus of FIG. 1.

It will be observed that a preferred embodiment of the apparatus for carrying out the method of this invention comprises a series of like units, each of which is equipped with means for connecting at each end to another like unit. One or more of the units is additionally equipped with power means which distinguishes it from its mating members. It is to be understood that each of the units could carry the power means if desired or that there could be any given number of the units carrying such power means although the power means could additionally be carried by an independent unit not connected to the overall chain of units utilized for the basic containment purposes. Each unit, whether or not power means is incorporated, will include a basic buoyant arrangement capable of floating upon water; a connecting element upon each end to connect to other units; jet carrier means; and jet means.

The units, for maximum efficiency, will have connecting means between each of the jet units.

The power unit will additionally contain or carry means for supplying power, such as a gasoline or diesel operated engine; fuel for such power means, pumping means; air pressure means and the like.

Examining particularly FIGS. 1, 2, 3 and 4, it will be observed that the unit comprises a flotation frame which consists of a flotation tube 11, another flotation tube 12, which can also act as an air supply reservoir; and two end flotation tank arrangements 13 and 23 respectively, each comprising a series of air tanks 15, 16, 17 and 25, 26 and 27 respectively, each of which may have drainage plugs 18 and the like as may be desired.

The units 11, 12, 13 and 23 may be welded together in a solid unit or otherwise appropriately fastened to form a basic raft-like arrangement.

It will be observed that a wave-guard 30 which may be comprised of aluminum sheeting or the like on appropriate frame and hinged for easy transportability at 31, is appropriately fastened by bracket 32 in a manner which is clear to those skilled in the art, so that any excessive wave action may be diverted from the power unit and the like located upon the basic contaminant containment unit.

A drop shield comprising primarily a sheet of metal or the like with appropriate angle iron stiffeners or the like as particularly shown and labeled upon the drawing, will be hinged at 53 to the air reservoir 12. The end of the drop shaft 50 carries a pipe 51 having various holes 52 generally as indicated in FIG. 4 and at spaced distances from one another.

The brackets 55 at spaced intervals and pinned by appropriate latching pin 57 as indicated, may be adjusted so as to have the angle of the drop shield 50 at that angle which is deemed most desirable for the particular operation and conditions encountered.

The drop shield may thus be pulled completely up for storage and easy transportability and dropped and latched in whatever position may be desired as particularly indicated in FIG. 4 when in use. An air supply tube 62 interconnects the air reservoir with the high pressure pipe 51.

It will be noted that the pressure line 62 to the pipe 51 could come directly from the air compressor or could come from a separate air pressure line on a ship or other unit as indicated in FIG. 6. Likewise, it could come directly from the air compressor and engine unit 60 indicated upon FIGS. 1 and 2 particularly. It is understood that the air compressor and engine unit 60 will be of customary air compressor construction and will provide among other things a source of fuel intergally mounted with the entire unit. This unit may be mounted upon the flotation units by appropriate angle iron or other braces 64, 65, 66 and 67 and suitably welded or otherwise fastened by means well-known in the art.

The drop shield, it should be noted, may also be allowed to seek its own level by gravity as indicated particularly in FIG. 6, only utilizing a chain 70 or the like for retaining the unit against too great an outward swing. Examining the structure in more detail, it will be observed that in operation the power unit supplies compressed air (or high pressure streams of water might be used) through the jet means 52. These high pressure jet streams create a series of very small air bubbles or the like which are directed against the drop shield as indicated particularly well in FIG. 4. The high pressure jet is creating small bubbles in the deeper water as indicated particularly in FIG. 4 and as the bubbles move upward directionally controlled by the drop shield into shallower water, they become larger bubbles and create a turbulence which contains and directs the contaminant.

FIG. 7 indicates where a complete chain of the units generally 10 for each unit, is used that a contaminate will be completely controlled within the configuration of the chain of units.

The fluid currents likewise cause the contaminate to be carried in the direction indicated from each of the contaminate containment units so that all of the contaminants remain within the confined area provided by the complete chain of units. Further contaminants entering the area from deeper portions of the water will, of course, be swept along and contained in this same area by the action of the bubbles as heretofore described, together with the fluid streams they create.

Additionally, the containment units and the jet carrying units will provide a physical barrier so that both hydraulic and physical barriers and containment arrangements are provided.

Figure 3:
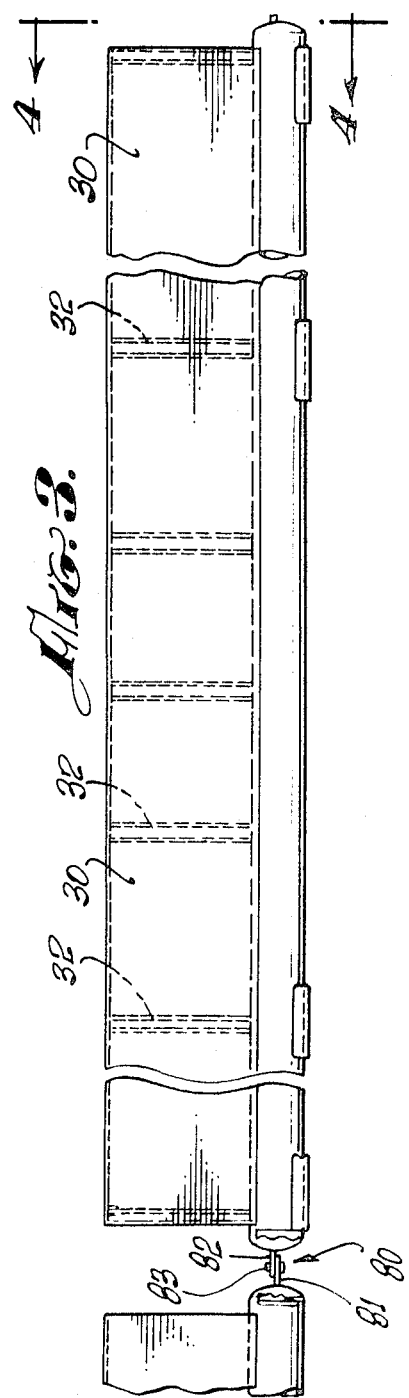
FIG. 3 is a front view of the item as shown in FIG. 2 with the drop shield retracted.

Each unit 10 is connected to the next unit by a suitable pair of matching brackets 81 and 82 with a bolt 83 comprising a latching unit 80 as particularly shown in FIGS. 3 and 1.

The arrangement as particularly indicated for hinging the units together of course allows for a flexibility so that the chain may be made as indicated in FIG. 7 or may be carried in a straight line or whatever may be desired.

The jet units will normally be connected by a flexible means between each segment in order to allow for differences in radius of connection based upon operating and inoperating positions, wave action, and the like.

FIGS. 8, 9 and 10 show particularly the use of these units on a tanker. The series of the units 10 may be stored around the entire deck of a ship as indicated in FIG. 8. In the event of leakage from the ship as indicated in FIG. 9, the units may be dropped to the water and activated so as to maintain the contaminant around the immediate vicinity of the ship.

As will be observed in FIG. 10, the units can be expelled by a line as indicated, dropped over the side of the ship and will come to rest appropriately as finally indicated in FIG. 10 wherein bubbles are shown indicating the fluid action from the air pressure to direct the contaminant inward to the ship.

It must be particularly pointed out that a reverse action of this device may also be provided. This would like-wise apply to the ship or to the unit as a whole in that an isolated area could be contained free from contaminant by directing the contaminant outward. Thus would the units connected together in the reverse position as indicated in FIG. 10 with the fluid action outwardly away from the ship, the ship itself would be maintained free of an outside contaminant. Likewise, it will be observed that under severe weather conditions and where necessary for whatever purpose, the surface disturbances on the body of water may be overcome and prevented from reaching a confined area in this latter application.

While the embodiment of this invention specifically shown and described is quite capable of achieving the objects and advantages desired, such embodiment has been shown and described for illustrative purposes only and not for purposes of limitation.

I claim:

1. Means for containing a contaminant on a liquid surface comprising flotation means supporting a fluid diverting shield means connected to the flotation means by hinge means and adjustable brace means for adjusting the angular relationship between the fluid diverting shield and flotation means, and shield means extending from the flotation means below the surface of the water and having at the end opposite the flotation means an air pressure tube provided with orifices directionally directing air under pressure upward against the shield means so that it causes eddies and currents to divert the flow of contaminant away from the flotation means and into a confined area.

* * * * *